(12) United States Patent
Pawar et al.

(10) Patent No.: US 12,568,253 B2
(45) Date of Patent: Mar. 3, 2026

(54) SERVER AND METHOD

(71) Applicant: 17LIVE Japan Inc., Tokyo (JP)

(72) Inventors: Jayneel Pawar, Tokyo (JP); Hemant Mehta, Tokyo (JP); Uday Kumar Edudula, Tokyo (JP); Ajay Prakash Mangale, Tokyo (JP)

(73) Assignee: 17LIVE JAPAN INC., Tokyo (JP)

( * ) Notice: Subject to any disclaimer, the term of this patent is extended or adjusted under 35 U.S.C. 154(b) by 0 days.

(21) Appl. No.: 18/441,003

(22) Filed: Feb. 14, 2024

(65) Prior Publication Data

US 2025/0119594 A1 Apr. 10, 2025

(30) Foreign Application Priority Data

Oct. 4, 2023 (JP) ................................. 2023-172577

(51) Int. Cl.
H04N 7/173 (2011.01)
H04N 21/2187 (2011.01)

(52) U.S. Cl.
CPC .............................. H04N 21/2187 (2013.01)

(58) Field of Classification Search
CPC ................................................ H04N 21/2187
USPC ......................................................... 725/116
See application file for complete search history.

(56) References Cited

U.S. PATENT DOCUMENTS

| | | | | |
|---|---|---|---|---|
| 8,595,763 | B1 * | 11/2013 | Packard ............. | H04N 21/8133 |
| | | | | 725/108 |
| 10,321,194 | B2 * | 6/2019 | Lewis ............. | H04N 21/44213 |
| 12,101,383 | B1 * | 9/2024 | Gao ...................... | H04L 67/306 |
| 12,165,178 | B1 * | 12/2024 | Engelberg ............. | G06F 16/955 |
| 2012/0190325 | A1 * | 7/2012 | Abu-Hakima ...... | H04L 12/1895 |
| | | | | 455/404.2 |
| 2013/0110947 | A1 * | 5/2013 | Boukadakis .......... | H04L 67/535 |
| | | | | 709/206 |
| 2015/0081674 | A1 * | 3/2015 | Ali ...................... | G06F 16/9038 |
| | | | | 707/722 |
| 2016/0277406 | A1 * | 9/2016 | Halligan ............. | H04L 63/0876 |
| 2018/0167688 | A1 * | 6/2018 | Lewis ............. | H04N 21/44213 |
| 2019/0007545 | A1 * | 1/2019 | Singh ...................... | H04L 67/55 |

(Continued)

FOREIGN PATENT DOCUMENTS

| | | |
|---|---|---|
| JP | 2021-64890 A | 4/2021 |
| JP | 7188718 B1 | 12/2022 |
| JP | 2023-115884 A | 8/2023 |

OTHER PUBLICATIONS

Notice of Reasons for Refusal dated Jan. 16, 2024, issued in corresponding Japanese Patent Application No. 2023-172577 with English translation (8 pgs.).

*Primary Examiner* — Sahar Aqil Riaz
(74) *Attorney, Agent, or Firm* — MUNCY, GEISSLER, OLDS & LOWE, P.C.

(57) ABSTRACT

A server of a livestreaming platform includes a circuitry configured to: hold, in a holding unit, a user ID for identifying a user on the livestreaming platform and livestreamer-of-interest IDs for identifying livestreamers of interest registered by the user as livestreamers that the user is interested in, in association with each other; and divide, in a processing unit, the livestreamers of interest into notification-allowed livestreamers of interest and other livestreamers of interest, a predetermined activity by the notification-allowed livestreamers of interest on the livestreaming platform triggering transmission of a notification to the user by the server.

7 Claims, 12 Drawing Sheets

(56) References Cited

U.S. PATENT DOCUMENTS

| | | | | |
|---|---|---|---|---|
| 2020/0057862 A1* | 2/2020 | Sabarish | G06F 21/31 | |
| 2020/0327711 A1* | 10/2020 | Walker | G06F 18/2321 | |
| 2021/0112286 A1 | 4/2021 | Shibata | | |
| 2021/0232942 A1* | 7/2021 | Lo | G06N 20/00 | |
| 2022/0114140 A1* | 4/2022 | Barnum | G06F 11/327 | |
| 2022/0210514 A1* | 6/2022 | McBeth | H04N 21/854 | |
| 2022/0360825 A1* | 11/2022 | Chen | H04N 21/4756 | |
| 2022/0360830 A1* | 11/2022 | Wang | H04N 21/23439 | |
| 2022/0385973 A1* | 12/2022 | Tang | H04N 21/44218 | |
| 2023/0007333 A1* | 1/2023 | Bancs | H04N 21/2743 | |
| 2023/0254544 A1* | 8/2023 | Tashiro | H04N 21/2187 | |
| | | | | 725/61 |
| 2023/0281703 A1* | 9/2023 | Li | G06Q 30/0278 | |
| | | | | 705/27.2 |
| 2023/0315776 A1* | 10/2023 | Martin | G06F 16/435 | |
| | | | | 707/769 |
| 2023/0316164 A1* | 10/2023 | Jackson | G06Q 30/0621 | |
| | | | | 705/5 |
| 2023/0353653 A1 | 11/2023 | Chen et al. | | |
| 2024/0009578 A1* | 1/2024 | Xiao | A63F 13/355 | |
| 2024/0039905 A1* | 2/2024 | Talavera | G06F 16/248 | |
| 2024/0153350 A1* | 5/2024 | Pasley | G07F 17/3258 | |
| 2024/0165512 A1* | 5/2024 | Pasley | A63F 13/533 | |
| 2024/0202769 A1* | 6/2024 | Li | G06Q 30/0243 | |
| 2024/0257092 A1* | 8/2024 | Bimolaksono | G06Q 20/389 | |
| 2024/0406478 A1* | 12/2024 | Hsu | H04N 21/4784 | |
| 2025/0016400 A1* | 1/2025 | Liu | H04N 21/4858 | |

* cited by examiner

Fig. 2                20

| Stream ID | Live-streamer ID | Viewer ID |
|-----------|------------------|-----------|
| ST22 | ABC | USR1, USR2, ... |
| ST92 | DEF | USR5, USR6, ... |

| User ID | Points | Re-ward | No. of Streams in Month | Total Streaming Time in Month | VIP Flag | Follo-wee ID | Total Gift Points | Total No. of Comment | No. of Views in Mo. | Total Viewing Time in Month | Top Spender | Top Gifter | Notifiable Flag |
|---|---|---|---|---|---|---|---|---|---|---|---|---|---|
| ABC | 3243 | 1500 | 15 | 4 | N | none | | | | | | | |
| DEF | 2510 | 800 | 20 | 5 | N | none | | | | | | | |
| USR1 | | | | | | ABC | 10000 | 100 | 10 | 3 | Y | Y | Y |
| | | | | | | DEF | 5000 | 50 | 5 | 1 | N | N | N |
| | 1803 | 0 | 0 | 0 | Y | GHJ | 8000 | 80 | 8 | 4 | N | Y | Y |
| | | | | | | ZZZ | 6000 | 50 | 4 | 2 | Y | N | N |
| USR5 | | | | | | ABC | 3000 | 30 | 3 | 1 | N | N | N |
| | 2504 | 0 | 0 | 0 | Y | DEF | 15000 | 200 | 18 | 4 | Y | Y | Y |
| | | | | | | KLM | 5000 | 30 | 13 | 3 | Y | N | Y |
| USR2 | | | | | | ABC | 1000 | 10 | 2 | 0.5 | | | N |
| | 500 | 0 | 0 | 0 | N | DEF | 3000 | 30 | 5 | 2 | | | Y |
| | | | | | | YYY | 100 | 5 | 1 | 0.1 | | | Y |
| USR6 | | | | | | ABC | 1500 | 10 | 3 | 1 | | | Y |
| | 700 | 0 | 0 | 0 | N | DEF | 350 | 0 | 1 | 0.2 | | | Y |
| | | | | | | XXX | 100 | 5 | 3 | 0.5 | | | Y |

318     Fig. 5

| Gift ID | Reward | Price Points |
|---------|--------|--------------|
| TT01 | 90 | 100 |
| TE01 | 180 | 200 |

SERVER AND METHOD

CROSS-REFERENCE TO RELATED APPLICATIONS

This application is based on and claims the benefit of priority from Japanese Patent Application Serial No. 2023-172577 (filed on Oct. 4, 2023), the contents of which are hereby incorporated by reference in its entirety.

TECHNICAL FIELD

The present disclosure relates to a server and a method.

BACKGROUND

With the development of IT technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video streaming services also became popular as storage costs were reduced. And nowadays or in the Reiwa period (2019 to present), with the sophistication of smartphones and further improvements in network speed as typified by 5G, services that enable real-time communication through video, especially livestreaming services, are gaining recognition. The number of users of livestreaming services is expanding, especially among young people, as such services allow people to share the same good time even when they are in the separate locations from each other.

Japanese Patent Application Publication No. 2023-115884 discloses a technique for notifying followers of a livestreamer of his/her livestreaming schedule.

Such notifications about livestreams may encourage users to watch the livestreams. However, this does not mean that all kinds of notifications should be sent to the users. If too many notifications are sent, users will dislike and ignore them, and thus lose its significance.

SUMMARY

In view of the above, one object of the present disclosure is to provide a technology that can optimize notifications about livestreams.

One aspect of the disclosure relates to a server. The server is for a livestreaming platform and includes a circuitry configured to: hold, in a holding unit, a user ID for identifying a user on the livestreaming platform and livestreamer-of-interest IDs for identifying livestreamers of interest registered by the user as livestreamers that the user is interested in, in association with each other; and divide, in a processing unit, the livestreamers of interest into notification-allowed livestreamers of interest and other livestreamers of interest, a predetermined activity by the notification-allowed livestreamers of interest on the livestreaming platform triggering transmission of a notification to the user by the server.

It should be noted that the components described throughout this disclosure may be interchanged or combined. The components, features, and expressions described above may be replaced by devices, methods, systems, computer programs, recording media containing computer programs, etc.

Any such modifications are intended to be included within the spirit and scope of the present disclosure.

ADVANTAGEOUS EFFECTS

According to the aspects of the disclosure, notifications about livestreams can be optimized.

BRIEF DESCRIPTION OF THE DRAWINGS

FIG. 4 is a data structure diagram showing, as an example, a stream DB shown in FIG. 3.

FIG. 5 is a data structure diagram showing, as an example, a user DB shown in FIG. 3.

FIG. 6 is a data structure diagram showing, as an example, a gift DB shown in FIG. 3.

DESCRIPTION OF THE EMBODIMENTS

Figure 1:
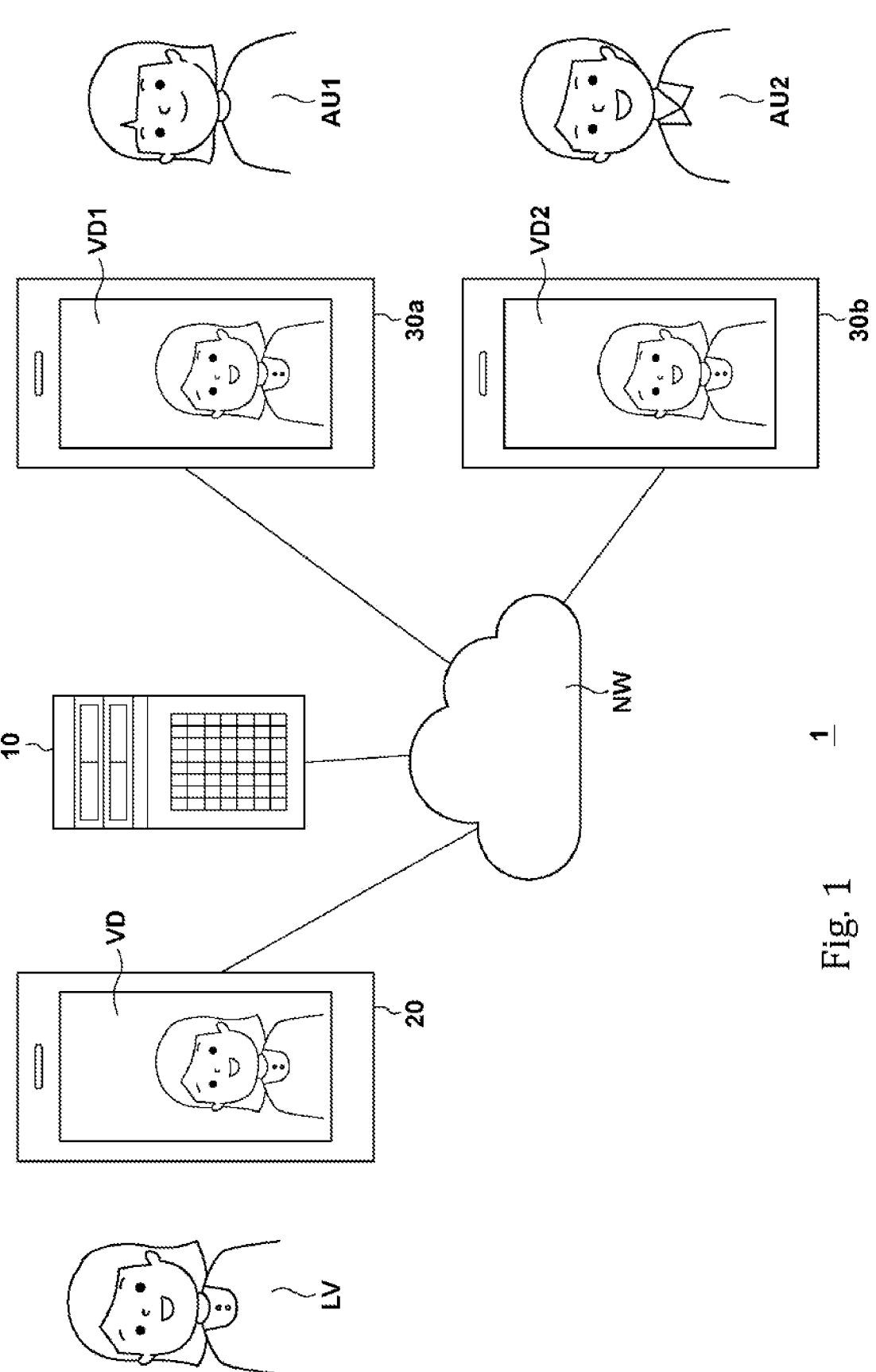
FIG. 1 schematically illustrates a configuration of a livestreaming system according to one embodiment of the disclosure.

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

The inventor of the present disclosure has obtained the following findings from our studies. When generation of notifications such as push notifications are triggered by livestreamer's predetermined activities on the livestreaming platform, such as starting a livestream and entering a schedule, and automatically transmitted to users who follow the livestreamer, the livestreamer can attract more viewers without much effort. This can make the livestreaming platform more active. On the other hand, if numerous notifications are sent to users, the users tend to feel bothered by the notifications. Therefore, there is a need to optimize notifications transmitted automatically on a livestreaming platform.

Notifications can be first optimized when the notifications are automatically generated. When automatically generating a notification, users to be notified can be selected. Specifically, when start of a livestream by a livestreamer is detected, a score is calculated for each follower of the livestreamer, and the followers are sorted by the calculated score. The notification is then sent only to a predetermined number of followers from the one with the highest score, and the notification is not transmitted to the remaining followers. This allows the livestreamer to reduce the number of potentially ineffective notifications, while at the same time ensuring that notifications are sent to users who are important to the livestreamer.

However, the above optimization of notification from the livestreamer's standpoint has the following drawbacks. When selecting important users from the livestreamer's standpoint, livestreamers tend to select users who pay or tip a larger amount of money (hereinafter collectively referred to as "VIPs"). When a large number of notifications are exclusively transmitted to VIPs, the VIPs will stop seeing notifications, which diminishes the significance of notification. Being frustrated by a large number of notifications, VIPs may leave the livestreaming platform. In addition, non-VIP users (hereafter referred to as "non-VIPs") do not receive notifications, and thus the livestreamer cannot expect to increase his/her viewers.

Therefore, the livestreaming system relating to the embodiment optimizes notification from the user's or follower's point of view, not from the livestreamer's point of view. In advance, an interest score is calculated for each of the livestreamers that the user follows (hereinafter referred to as "followee"), and the followees are sorted by the calculated interest score. Followees with high interest scores are registered as followees whose notifications are allowed to transmit to the follower. When the start of a livestream by a livestreamer is detected, the system transmits a notification to the followers for which the livestreamer is registered as their followee whose notifications are allowed to send to the followers. This enables that VIPs receive notifications from important followees while reducing the number of notifications. As a result, the retention of VIPs on the livestreaming platform can be increased. In addition, even non-VIPs will receive a certain number of notifications if they follow livestreamers, thus maintaining or improving the livestreamers' presence.

Figure 7:
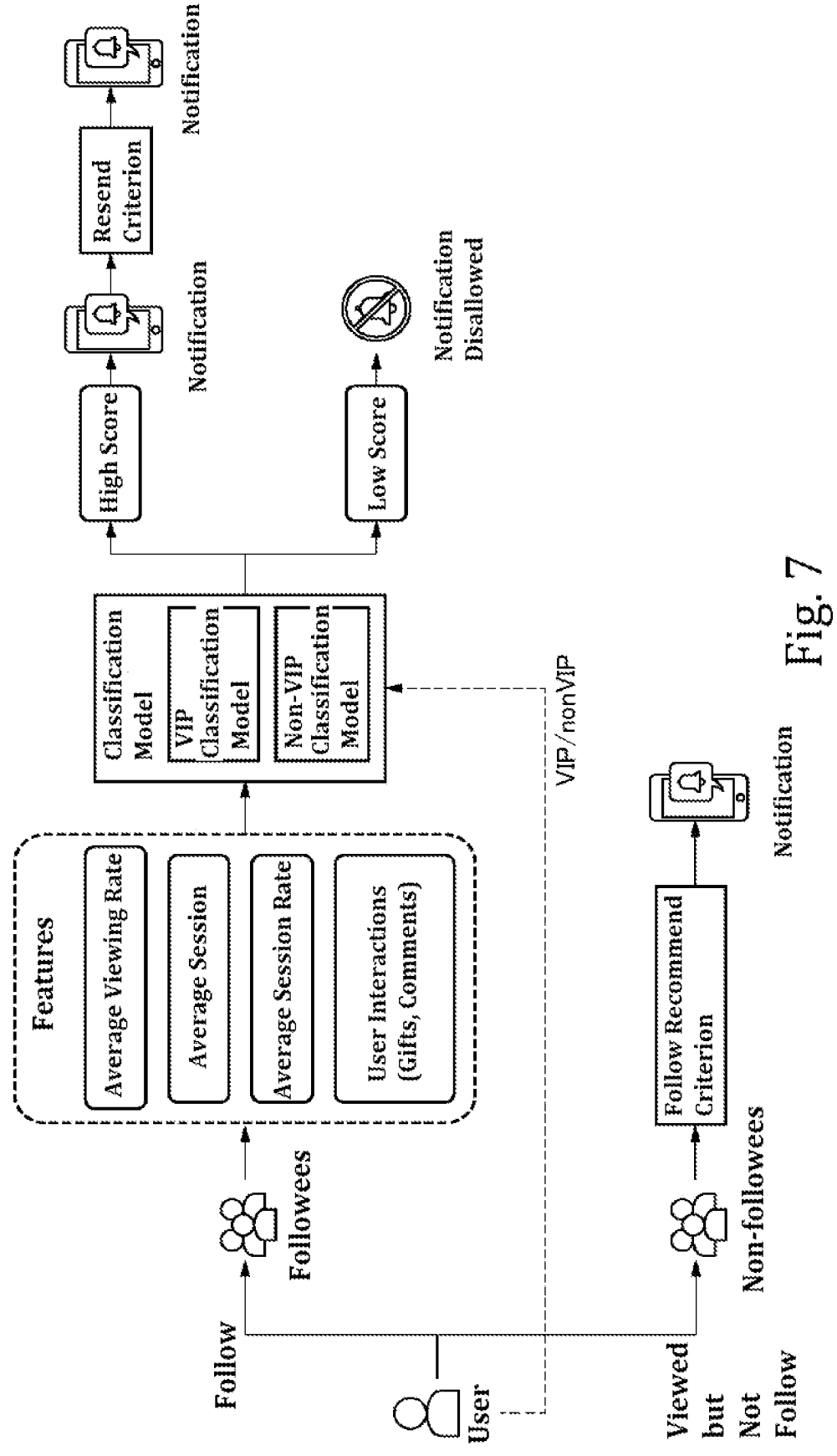
FIG. 7 schematically illustrates the optimization of notifications from the user's point of view in the livestreaming system of FIG. 1.

FIG. 7 schematically illustrates optimization of notification from the user's point of view in the livestreaming system relating to the embodiment. A user is associated with followees who are livestreamers that the user follows, and non-followees that the user has watched livestreams in the past but the user does not follow them. For each followee of the user, the system calculates and obtains, as features, parameters indicating the degree of contribution from the user to the followee in the followee's livestreams. The features include average viewing rate, average session, average session rate, user interactions (gifts, comments), etc. The system inputs the obtained features into a classification model. The classification model is a machine learning model that takes the above features as input and outputs an interest score indicating the degree of interest in the followee by the user. The higher the interest score, the higher the degree of interest in the followee by the user. The machine learning model itself may be realized using known machine learning techniques. In this embodiment, different classification models are used depending on whether the user is the VIP or not. If the user is the VIP, a VIP classification model is used, and if the user is the non-VIP, a non-VIP classification model is used.

The system divides followees of the user into notification-allowed and notification-disallowed followees according to a predetermined criterion regarding the interest score outputted by the classification model. When the interest score of a followee exceeds a threshold value, the followee is registered as the notification-allowed followee. When a followee is not registered as the notification-allowed followee, then the followee is registered as the notification-disallowed followee. Alternatively, when the interest score of a followee is below a threshold value, the followee is registered as the notification-disallowed followee. When a followee is not registered as the notification-disallowed followee, then the followee is registered as the notification-allowed followee. In any case, the user's level of interest in the notification-allowed followee will be higher than that of the notification-disallowed followee.

The system sends a push notification to the user triggered by a predetermined activity by the notification-allowed followee of the user. The system then resends a push notification with the same or similar content to the user when a predetermined resend criterion is satisfied. The system does not send a push notification to the user even if it detects the predetermined activity by the notification-disallowed followee of the user.

When a non-followee of the user satisfies a predetermined follow recommendation criterion, the system sends a notification to the user recommending that the user follow the non-followee.

In this way, the followees that the user follows are divided into the notification-allowed and disallowed followees, and notifications about predetermined activities of the notification-disallowed followees are no longer sent to the user. In this way, notification can be optimized by reducing the number of unimportant notifications from the user's perspective while continuing to send important notifications.

FIG. 1 schematically illustrates the configuration of a livestreaming system 1 according one embodiment of the disclosure. The livestreaming system 1 provides an interactive livestreaming service that allows a livestreamer LV (also referred to as a liver or streamer) and a viewer AU (also referred to as audience) (AU1, AU2, . . . ) to communicate in real time. As shown in FIG. 1, the livestreaming system 1 includes a server 10, a user terminal 20 on the livestreamer side, and user terminals 30 (30a, 30b . . . ) on the audience side. In addition to the livestreamer who is livestreaming and the viewers who watch the livestream, there may be users who have logged in the livestreaming platform but is neither livestreaming nor watching the livestream. Such users are referred to as active users. The livestreamer, the viewers, and the active users may be collectively referred to as users. The server 10 may be one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop PCs. The server 10, the user terminal 20, and the user terminals 30 are interconnected so as to be able to communicate with each other over the various wired or wireless network NW.

The livestreaming system 1 involves the livestreamer LV, the viewers AU, and an administrator (not shown) who manages the server 10. The livestreamer LV is a person who broadcasts contents in real time by recording the contents with his/her user terminal 20 and uploading them directly to the server 1. Examples of the contents may include the livestreamer's own songs, talks, performances, fortune-telling, gameplays, and any other contents. The administrator provides a platform for livestreaming contents on the server 10, and also mediates or manages real-time interactions between the livestreamer LV and the viewers AU. The viewers AU access the platform at their user terminals 30 to select and view a desired content. During livestreaming of the selected content, the viewer AU performs operations to comment, cheer, or ask fortune-telling via the user terminal 30, the streamer LV who is delivering the content responds to such a comment, cheer, or request and such response is transmitted to the viewer AU via video and/or audio, thereby establishing an interactive communication.

As used herein, the term "livestreaming" or "livestream" may mean a mode of data transmission that allows a content recorded at the user terminal 20 of the livestreamer LV to be played and viewed at the user terminals 30 of the viewers AU substantially in real time, or it may mean a live broadcast realized by such a mode of transmission. The livestreaming may be achieved using existing livestreaming technologies such as HTTP Live Streaming, Common Media Application Format, Web Real-Time Communications, Real-Time Messaging Protocol and MPEG DASH. The livestreaming includes a transmission mode in which, while the livestreamer LV is recording contents, the viewers AU can view the contents with a certain delay. The delay is acceptable as long as interaction between the livestreamer LV and the viewers AU can be at least established. Note that the livestreaming is distinguished from so-called on-demand distribution, in which contents are entirely recorded and the entire data is once stored on the server and the server provides users with the data at any subsequent time upon request from the users.

The term "video data" herein refers to data that includes image data (also referred to as moving image data) generated using an image capturing function of the user terminals 20 and 30 and audio data generated using an audio input function of the user terminals 20 and 30. Video data is reproduced in the user terminals 20 and 30, so that the users can view contents. In this embodiment, it is assumed that between video data generation at the livestreamer's user terminal and video data reproduction at the viewer's user terminal, processing is performed onto the video data to change its format, size, or specifications of the data, such as compression, decompression, encoding, decoding, or transcoding. However, such processing does not substantially change the content (e.g., video images and audios) represented by the video data, so that the video data after such processing is herein described as the same as the video data before such processing. In other words, when video data is generated at the livestreamer's user terminal and then played back at the viewer's user terminal via the server 10, the video data generated at the livestreamer's user terminal, the video data that passes through the server 10, and the video data received and reproduced at the viewer's user terminal are all the same video data.

As used herein, "livestream duration" is a parameter associated with a single livestream and refers to the length of time during which the livestream continues. The livestream duration is calculated irrespective of whether or not there are any viewers of the livestream. As used herein, "total livestreaming time" is a parameter associated with a livestreamer and is obtained by adding up the durations of livestreams performed by the livestreamer in a given period of time. As used herein, "total view duration" is a parameter associated with a viewer-streamer pair and shows the amount of time the viewer has spent watching a livestream of the livestreamer. If the livestreaming includes more than one session, the length of each session shall be aggregated.

In the example in FIG. 1, a livestreamer LV is livestreaming his/her talk. The user terminal 20 of the livestreamer LV generates video data by recording images and sounds of the livestreamer LV who is talking, and the generated data is transmitted to the server 10 over the network NW. At the same time, the user terminal 20 displays the recorded video image VD of the livestreamer LV on the display of the user terminal 20 to allow the livestreamer LV to check what is to be streamed.

The user terminals 30a and 30b of the viewers AU1 and AU2 respectively, who have requested the platform to enable them to view the livestream of the livestreamer LV, receive video data related to the livestream over the network NW and reproduce the received video data, to display video images VD1 and VD2 on the displays and output audio through the speakers. The video images VD1 and VD2 displayed at the user terminals 30a and 30b, respectively, are substantially the same as the video image VD captured by the user terminal 20 of the livestreamer LV, and the audio outputted at the user terminals 30a and 30b is substantially the same as the audio recorded by the user terminal 20 of the livestreamer LV.

Recording of the images and sounds at the user terminal 20 of the livestreamer LV and reproduction of the video data at the user terminals 30a and 30b of the viewers AU1 and AU2 are performed substantially simultaneously. The viewer AU1 may type a comment about the talk of the livestreamer LV on the user terminal 30a, and the server 10 may display the comment on the user terminal 20 of the livestreamer LV in real time and also display the comment on the user terminals 30a and 30b of the viewers AU1 and AU2, respectively. The livestreamer LV may read the comment and develop his/her talk to cover and respond to the comment, and the video and sound of the talk are output on the user terminals 30a and 30b of the viewers AU1 and AU2, respectively. This interactive action is recognized as establishment of a conversation between the livestreamer LV and the viewer AU1. In this way, the livestreaming system 1 realizes the livestreaming that enables the interactive communication, not one-way communication.

Figure 2:
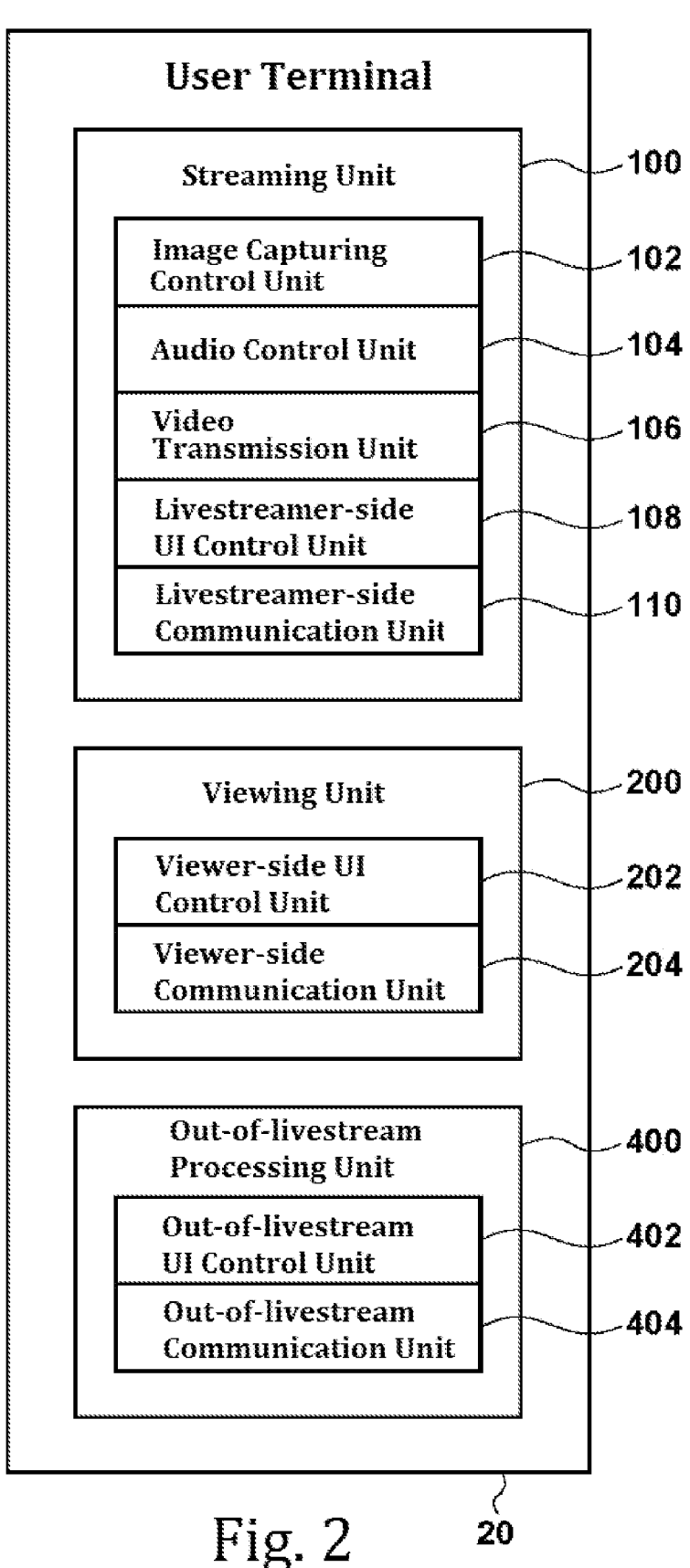
FIG. 2 is a block diagram showing functions and configuration of a user terminal of FIG. 1.

FIG. 2 is a block diagram showing functions and configuration of the user terminal 20 of FIG. 1. The user terminals 30 have the same functions and configuration as the user terminal 20. The blocks in FIG. 2 and the subsequent block diagrams may be realized by elements such as a computer CPU or a mechanical device in terms of hardware, and can be realized by a computer program or the like in terms of software. The blocks shown in the drawings are, however, functional blocks realized by cooperative operation between hardware and software. Therefore, it is understood by those skilled in the art that these functional blocks can be realized in various forms by combining hardware and software.

The livestreamer LV and the viewers AU download and install a livestreaming application program (hereinafter referred to as a livestreaming application), onto the user terminals 20 and 30 from a download site over the network NW. Alternatively, the livestreaming application may be pre-installed on the user terminals 20 and 30. When the livestreaming application is executed on the user terminals 20 and 30, the user terminals 20 and 30 communicate with the server 10 over the network NW to implement various functions. Hereinafter, the functions implemented by (processors such as CPUs of) the user terminals 20 and 30 by running the livestreaming application will be described as functions of the user terminals 20 and 30. These functions are realized in practice by the livestreaming application on the user terminals 20 and 30. In any other embodiments, these functions may be realized by a computer program written in a programming language such as HTML (Hyper Text Markup Language), which is transmitted from the server 10 to web browsers of the user terminals 20 and 30 over the network NW and executed by the web browsers.

The user terminal 20 includes a streaming unit 100 for generating a video data in which the user's image and sound are recorded and providing the video data to the server 10, a viewing unit 200 for acquiring and reproducing the video data from the server 10, and an out-of-livestream processing unit 400 for processing requests made by active users. The user activates the streaming unit 100 to livestream, the viewing unit 200 to view a livestream, and the out-of-livestream processing unit 400 to look for a livestream, view a livestreamer's profile, or watch an archive. The user terminal having the streaming unit 100 activated is the livestreamer's terminal, i.e., the user terminal that generates video data, the user terminal having the viewing unit 200 activated is the viewer's terminal, i.e., the user terminal that reproduces video data, and the user terminal having the out-of-livestream processing unit 400 activated is the active user's terminal.

The streaming unit 100 includes an image capturing control unit 102, an audio control unit 104, a video transmission unit 106, a streamer-side UI control unit 108, and a streamer-side communication unit 110. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time.

The livestreamer-side UI control unit 108 controls a UI for the livestreamer. The livestreamer-side UI control unit 108 is connected to a display (not shown in FIG. 2), and displays a video on the display by reproducing the video data that is to be transmitted by the video transmission unit 106. The livestreamer-side UI control unit 108 is also connected to input means (not shown in FIG. 2) such as touch panels, keyboards, and displays, and obtains the livestreamer's input via the input means. The livestreamer-side UI control unit 108 superimposes a predetermined frame image on the video image. The frame image includes various user interface objects (hereinafter simply referred to as "objects") for receiving inputs from the livestreamer, comments entered by the viewers, and information obtained from the server 10. The livestreamer-side UI control unit 108 receives, for example, the livestreamer's inputs made by the livestreamer tapping the objects.

The livestreamer-side communication unit 110 controls communication with the server 10 during a livestream. The livestreamer-side communication unit 110 transmits the content of the livestreamer's input that has been obtained by the streamer-side UI control unit 108 to the server 10 over the network NW. The livestreamer-side communication unit 110 receives various information associated with the livestream from the server 10 over the network NW.

The viewing unit 200 includes a viewer-side UI control unit 202 and a viewer-side communication unit 204. The viewer-side communication unit 204 controls communication with the server 10 during a livestream. The viewer-side communication unit 204 receives, from the server 10 over the network NW, video data related to the livestream in which the livestreamer and the viewer participate.

The viewer-side UI control unit 202 controls the UI for the viewer. The viewer-side UI control unit 202 is connected to a display and a speaker (not shown in FIG. 2), and reproduces the received video data so that video images are displayed on the display and sounds are output through the speaker. The state where the images and sounds are respectively output through the display and speaker can be referred to as "the video data is reproduced". The viewer-side UI control unit 202 is also connected to input means (not shown in FIG. 2) such as touch panels, keyboards, and displays, and obtains viewer's input via the input means. The viewer-side UI control unit 202 superimposes a predetermined frame image on an image generated from the video data obtained from the server 10. The frame image includes various objects for receiving inputs from the viewer, comments entered by the viewer, and information obtained from the server 10. The viewer-side communication unit 204 transmits the content of the viewer's input that has been obtained by the viewer-side UI control unit 202 to the server 10 over the network NW.

The out-of-livestream processing unit 400 includes an out-of-livestream UI control unit 402 and an out-of-livestream communication unit 404. The out-of-livestream UI control unit 402 controls a UI for the active user. For example, the out-of-livestream UI control unit 402 generates a livestream selection screen and shows the screen on the display. The livestream selection screen presents a list of livestreams to which the active user is currently invited to participate to allow the active user to select a live stream. The out-of-livestream UI control unit 402 generates a profile screen for any user and shows the screen on the display. The out-of-livestream UI control unit 402 plays back an archived past livestream, which is recorded and stored.

The out-of-livestream communication unit 404 controls communication with the server 10 that takes place outside a livestream. The out-of-livestream communication unit 404 receives, from the server 10 over the network NW, information necessary to generate the livestream selection screen, information necessary to generate the profile screen, and archived data. The out-of-livestream communication unit 404 transmits the content of the active user's input to the server 10 over the network NW.

Figure 3:
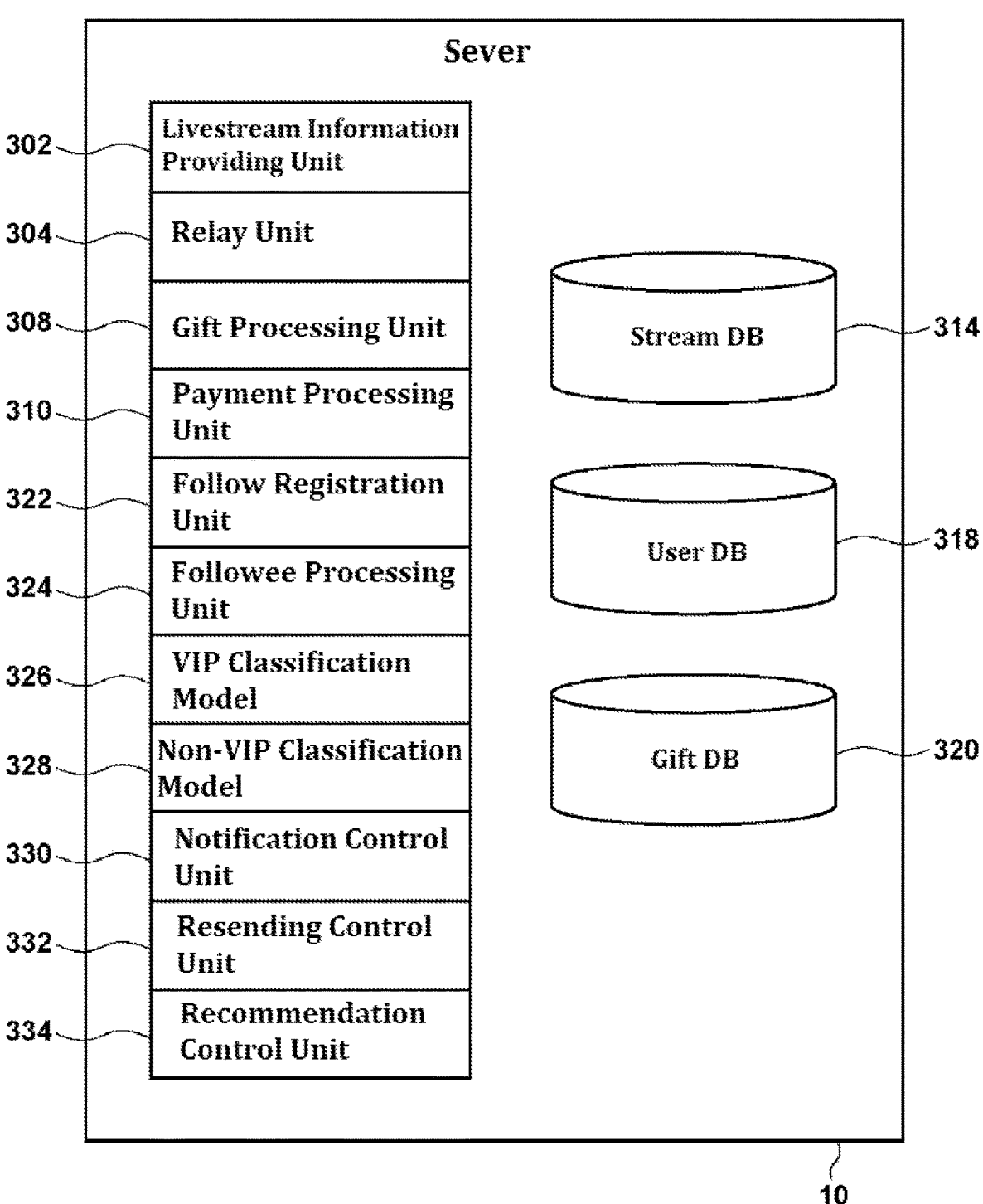
FIG. 3 is a block diagram showing functions and configuration of a server shown in FIG. 1.

FIG. 3 is a block diagram showing functions and configuration of the server 10 of FIG. 1. The server 10 includes a livestream information providing unit 302, a relay unit 304, a gift processing unit 308, a payment processing unit 310, a follow registration unit 322, a followee processing unit 324, a VIP classification model 326, a non-VIP classification model 328, a notification control unit 330, a resend control unit 332, a recommendation control unit 334, a stream DB 314, a user DB 318, and a gift DB 320.

FIG. 4 is a data structure diagram showing an example of the stream DB 314 of FIG. 3. The stream DB 314 holds information regarding livestreams currently taking place. The stream DB 314 stores a stream ID identifying a livestream on a livestreaming platform provided by the livestreaming system 1, a livestreamer ID, which is a user ID identifying the livestreamer who provides the livestream, and a viewer ID, which is a user ID identifying a viewer of the livestream, in association with each other.

In the livestreaming platform provided by the livestreaming system 1 of the embodiment, when a user livestreams, the user is referred to as a livestreamer, and when the same user views a livestream streamed by another user, the user is referred to as a viewer. Therefore, the distinction between a livestreamer and a viewer is not fixed, and a user ID registered as a livestreamer ID at one time may be registered as a viewer ID at another time.

FIG. 5 is a data structure diagram showing an example of the user DB 318 of FIG. 3. The user DB 318 holds information regarding users. The user DB 318 stores a user ID for identifying a user, points owned by the user, a reward awarded to the user, the number of livestreams that the user performed in the current month, total livestreaming time of the user for the current month, a VIP flag indicating whether the user is the VIP or not, a followee ID for identifying a followee of the user, parameters indicating the degree of contribution from the user to the followee in livestreams, and a notifiable flag indicating whether the followee is the notification-allowed or disallowed followee of the user, in association with each other. When the user follows two or more livestreamers, two or more followee IDs are registered in association with the user ID of the user.

The points are an electronic representation of value circulated in the livestreaming platform. The user can purchase the points using a credit card or other means of payment. The reward is an electronic representation of value defined in the livestreaming platform and is used to determine the amount of money the livestreamer receives from the administrator of the livestreaming platform. In the livestreaming platform, when a viewer gives a gift to a livestreamer within or outside a livestream, the viewer's points are consumed and, at the same time, the livestreamer's reward is increased by a corresponding amount.

The number of livestreams in the current month is the number of livestreams made by the user in the period starting from the beginning of the current month up until the present time. The total livestreaming time in the current month is the total time from the beginning of the current month to the present time. The number of livestreams in the current month and the total livestreaming time in the current month may be updated by the update unit not shown in the drawings.

In this embodiment of the live streaming system 1, for each livestream, log data indicating who and when started and ended the livestream, who and when participated in the livestream as a viewer and when left the livestream, who and when posted which comment in the livestream, who gave which gift is obtained and stored. The above-mentioned number of livestreams and total livestreaming time in the current month, total gift points, total number of comments, number of views in the current month, total viewing time in the current month, top spender or not, and top gifter or not are calculated or determined by referring to this log data.

The VIP flag may be set automatically by the system using a predetermined algorithm based on the amount the amount of money paid to the livestreamer, etc., or the VIP flag may be set by the administrator of the livestreaming platform.

The parameters indicating the degree of contribution from the user to the followee in the livestreams include: total gift points, which is the total number of gift points given by the user to the followee; total number of comments, which is the total number of comments posted by the user in the followee's livestreams; the number of views the user has viewed the followee's livestreams in the current month and the total viewing time in the current month; and a flag indicating whether the user is a top spender or not. The number of views in the current month is the number of livestreams of the followee that the user has viewed in the period from the beginning of the month to the present time. The total viewing time in the current month is the total viewing time of the livestreams of the followee that the user has viewed in the period from the beginning of the month to the present time.

The top spender is a user who highly ranks (e.g., 10th or 20th) in a ranking (e.g., ranking of the amount of gifts given to the followee) for the target followee. When the user is a top spender of the target followee, the flag is Y; otherwise, the flag is N.

The top gifter is the user who gave a top gift in a livestream of the target followee. When the user is the top gifter of the target followee, the flag is Y; otherwise, the flag is N. The top gift refers to a gift (type of gift) that highly ranks (e.g., 10th or 20th) when gifts given to the target followee are sorted by the number of gifts. Whether a gift is the top gift or not is not related to the price points of the gift. Even when a gift is inexpensive, if a large number of the gift are given to the livestreamer, the gift is the livestreamer's top gift; conversely, even when a gift is expensive but a small number of the gift are given to the livestreamer, the gift is not the top gift. As will be described below, whether or not the user is the top gifter is one of the features inputted into the VIP classification model 326, but it is not a feature inputted into the non-VIP classification model 328. This is based on the inventor's original finding that the VIPs tend to repeatedly give specific gifts to their favorite livestreamers. When a VIP is the top gifter of a followee, it can be determined that the bond and connection between the VIP and the followee are strong.

For example, suppose followee "A" receives 100 gifts "X" (the price points for this gift are 100), 50 gifts "Y" (the price points for this gift are 500), and 10 gifts "Z" (the price points for this gift are 3000). In this case, the gift "X" is the top gift, and the gifts "Y" and "Z" are not the top gifts. If VIP "B" gives the gift "Z" to the followee "A", VIP "C" gives the gift "Y" to the followee "A", and VIP "D" gives the gift "X" to the followee "A", VIP "D" is the top gifter for the followee "A", but VIPs "B" and "C" are not the top gifters, even though they gave more expensive gifts.

FIG. 6 is a data structure diagram showing an example of the gift DB 320 of FIG. 3. The gift DB 320 holds information regarding gifts available for the viewers in relation to the livestreaming. A gift is a digital item or electronic data with the following characteristics:

It can be purchased in exchange for the points or money, or can be given for free.

It can be given by a viewer to a livestreamer. Giving a gift to a livestreamer is also referred to as using the gift or throwing the gift.

Some gifts may be purchased and used at the same time, and some gifts may be used by the viewer at any time after purchased.

When a viewer gives a gift to a livestreamer, the livestreamer is given a corresponding reward.

When a gift is used, the use may trigger an effect associated with the gift. For example, an effect corresponding to the gift will appear on the livestreaming room screen.

The gift DB 320 stores: a gift ID for identifying a gift; a reward to be awarded, which is a reward awarded to a livestreamer when the gift is given to the livestreamer; and price points, which is the amount of points to be paid for use of the gift, in association with each other. A viewer is able to give a desired gift to a livestreamer by paying the price points of the desired gift while viewing the livestream. The payment of the price points may be made by appropriate electronic payment means. For example, the payment may be made by the viewer paying the price points to the administrator. Alternatively, bank transfers or credit card payments may be available. The administrator is able to desirably set the relationship between the reward to be awarded and the price points. For example, it may be set as the reward to be awarded=the price points. Alternatively, points obtained by multiplying the reward to be awarded by a predetermined coefficient such as 1.2 may be set as the price points, or points obtained by adding predetermined fee points to the reward to be awarded may be set as the price points.

Referring again to FIG. 3, upon reception of a request to start a livestream over the network NW from the user terminal 20 of the livestreamer, the stream information providing unit 302 registers in the stream DB 314 a stream ID identifying this livestream and the livestreamer ID of the livestreamer who performs the livestream. When the stream information providing unit 302 receives a request for information about livestreams from the out-of-livestream communication unit 404 of a user terminal of an active user over the network NW, the stream information providing unit 302 refers to the stream DB 314 and makes a list of currently available livestreams. The stream information providing unit 302 transmits the generated list to the requesting user terminal over the network NW. The out-of-livestream UI control unit 402 of the requesting user terminal generates a livestream selection screen based on the received list and shows the livestream selection screen on the display of the user terminal.

Once the out-of-livestream UI control unit 402 of the user terminal receives the active user's selection of a livestream on the livestream selection screen, the out-of-livestream UI control unit 402 generates a stream request including the stream ID of the selected livestream, and transmits the stream request to the server 10 over the network NW. The stream information providing unit 302 starts to provide, to the requesting user terminal, the livestream identified by the stream ID included in the received stream request. The stream information providing unit 302 updates the stream DB 314 such that the user ID of the active user of the requesting user terminal is included in the viewer IDs for the stream ID. In this way, the active user can become a viewer of the selected livestream.

Once the out-of-livestream UI control unit 402 of the user terminal receives an instruction to stat viewing a livestream via a livestream start push notification, which will be described later, from the active user, the out-of-livestream UI control unit 402 generates a stream request including the stream ID of the livestream related to the streaming start push notification, and transmits the stream request to the server 10 over the network NW. The stream information providing unit 302 starts to provide, to the requesting user terminal, the livestream identified by the stream ID included in the received stream request. The stream information providing unit 302 updates the stream DB 314 such that the user ID of the active user of the requesting user terminal is included in the viewer IDs for the stream ID. In this way, the active user can become a viewer of the selected livestream.

The relay unit 304 relays the video data from the streamer-side user terminal 20 to the viewer-side user terminal 30 in the livestream started by the stream information providing unit 302. The relay unit 304 receives from the viewer-side communication unit 204 a signal that represents user input by a viewer during the livestream or reproduction of the video data. The signal that represents user input may be an object specifying signal for specifying an object displayed on the display of the user terminal 30, and the object specifying signal includes the viewer ID of the viewer, the livestreamer ID of the livestreamer of the livestream that the viewer watches, and an object ID that identifies the object. When the object is a gift icon, the object ID is the gift ID. The object specifying signal in that case is a gift use signal indicating that the viewer uses a gift for the livestreamer. Similarly, the relay unit 304 receives from the streamer-side communication unit 110 of the streaming unit 100 in the user terminal 20 a signal that represents user input by the livestreamer during reproduction of the video data, such as the object specifying signal.

The gift processing unit 308 updates the user DB 318 so as to increase the reward for the livestreamer depending on the reward to be awarded of the gift identified by the gift ID included in the gift use signal. Specifically, the gift processing unit 308 refers to the gift DB 320 to specify a reward to be awarded for the gift ID included in the received gift use signal. The gift processing unit 308 then updates the user DB 318 to add the specified reward to be awarded to the reward for the livestreamer ID included in the gift use signal. The gift processing unit 308 registers the information on the used gift in a gift information holding unit, which is not shown in the drawings. The information held in the gift information holding unit is used in calculation of features as described below.

The payment processing unit 310 processes payment of a price of the gift by the viewer in response to reception of the gift use signal. Specifically, the payment processing unit 310 refers to the gift DB 320 to specify the price points of the gift identified by the gift ID included in the gift use signal. The payment processing unit 310 then updates the user DB 318 to subtract the specified price points from the points of the viewer identified by the viewer ID included in the gift use signal.

The follow registration unit 322 controls following a livestreamer by a user. The follow registration unit 322 receives a follow request from the user terminal over the network NW, which includes the user ID of the user who instructed to follow and the livestreamer ID of the followed livestreamer. When a viewer inputs the instruction to user terminal 20 to follow (or register) the livestreamer of a livestream while viewing the livestream on the user terminal 20, the viewer-side communication unit 204 of the user terminal 20 generates the follow request and transmits it to the follow registration unit 322. Or when an active user inputs the instruction to follow a livestreamer when viewing the profile screen of that livestreamer, the out-of-livestream communication unit 404 of the user terminal generates the follow request and transmits it to the follow registration unit 322.

The follow registration unit 322 updates the user DB 318 so that the followed livestreamer is registered as a followee of the user who instructed the follow. The follow registration unit 322 newly registers or adds the livestreamer ID included in the follow request as the followee ID corresponding to the user ID included in the follow request in the user DB 318.

The followee processing unit 324 periodically calculates the total gift points, total number of comments, number of views in the current month, and total viewing time in the current month for each followee of the user, and updates the user DB 318 with the calculated values. For users whose VIP flag is Y, the followee processing unit 324 determines whether the user is the top spender for each followee and updates the user DB 318 with the result of that determination. For users whose VIP flag is Y, the followee processing unit 324 determines whether the user is the top gifter for each followee, and updates the user DB 318 with the result of that determination.

The followee processing unit 324 divides the user's followees into the notification-allowed followees, which are followees whose predetermined activity on the livestreaming platform can trigger the transmission of the livestream start notification to the user by the server, and notification-disallowed followees whose push notification are not transmitted with their predetermined activity. The followee processing unit 324 divides the followees into the notification-allowed followees and notification-disallowed followees based on the interest score calculated for each followee by the machine learning model. The followee processing unit 324 uses different machine learning models depending on the amount of money spent by the user on the livestreaming platform.

As an example of how to divide followees, the followee processing unit 324 selects the notification-allowed followees from among the user's followees based on the interest score, and selects followees that are not selected as the notification-allowed followees as the notification-disallowed followees. The followee processing unit 324 registers the result of the selection in the user DB 318 in association with the user. The followee processing unit 324 sets the notifiable flag of the followee selected as the notification-allowed to Y, and sets the notifiable flag of the followee selected as the notification-disallowed followee to N. The processing performed in the followee processing unit 324 will be further described later.

The VIP classification model 326 is a machine learning model that takes as input VIP/non-VIP common features between a VIP and his/her followee and VIP-specific features between the VIP and its followee, and outputs the interest score. The VIP classification model 326 is generated by training using historical data on VIPs as training data.

The non-VIP classification model 328 is a machine learning model that takes the VIP/non-VIP common features between a non-VIP and his/her followee as input and outputs the interest score. The non-VIP classification model 328 is generated by training using historical data on non-VIPs as training data.

The VIP/non-VIP common features are listed below.
Total gift points
Total number of comments
Average viewing rate
Average session
Average session rate
For each VIP/non-VIP common feature, the higher the value, the higher the degree of contribution from the VIP to the followee in the livestreams. In addition, for example, the VIP/non-VIP common features may include whether they have competed in a VS livestream, whether they have streamed together in a group livestream, and whether they follow each other.

The average viewing rate between the VIP and his/her followee is calculated by dividing the number of times the VIP has watched the followee's livestreams in the current month by the number of times the followee provided livestreams in the current month. The average session between the VIP and his/her followee is calculated by dividing the total viewing time the VIP has viewed the livestreams of the followee in the current month by the number of times the VIP viewed the followee's livestreams in the current month. The average session rate between the VIP and his/her followee is calculated by dividing the total viewing time the VIP has viewed the livestreams of the followee in the current month by the total livestreaming time of the followee in the current month.

The VIP-specific features are listed below.
Top spender or not
Top gifter or not
For each VIP-specific feature, "Y" indicates a relatively high degree of contribution from the VIP to the followee in the livestreams, while "N" indicates a relatively low degree of contribution.

In the example of FIG. 5, the VIP/non-VIP common features and VIP-specific features between the user "USR1" and his/her followee "ABC" are as follows:
Total gift points=10000
Total number of comments=100
Average viewing rate=$10/15$=0.67
Average session=$3/10$=0.3
Average session rate=$3/4$=0.75
Top spender or not=Y
Top gifter or not=Y
In the example of FIG. 5, the VIP/non-VIP common features and VIP-specific features between the user "USR1" and his/her followee "DEF" are as follows:
Total gift points=5000
Total number of comments=50
Average viewing rate=$5/20$=0.25
Average session=$1/5$=0.2
Average session rate=$1/5$=0.2
Top spender or not=N
Top gifter or not=N
The followee processing unit 324 refers to the VIP flag in the user DB 318 and determines that the user "USR1" is the VIP. The followee processing unit 324 selects the VIP classification model 326 between the VIP classification model 326 and non-VIP classification model 328 according to the determination result. The followee processing unit 324 inputs the VIP/non-VIP common features and VIP-specific features calculated as described above for the followee "ABC" into the selected VIP classification model 326. The VIP classification model 326 outputs the interest score that corresponds to the inputted features. For example, the VIP classification model 326 outputs the interest score=0.9 corresponding to values of the VIP/non-VIP common features and VIP-specific features for the followee "ABC". The interest score is configured to vary in the range of 0 to 1, with the higher the score, the greater the degree of interest. Similarly, the followee processing unit 324 inputs the VIP/non-VIP common features and VIP-only features calculated as described above for the followee "DEF" into the selected VIP classification model 326. For example, the VIP classification model 326 outputs the interest score=0.2 that corresponds to the values of the VIP/non-VIP common features and VIP-specific features for the followee "DEF".

In the followee processing unit 324, an interest score threshold=0.5 is set as the criterion for notification allowed or disallowed. The followee processing unit 324 determines that the followee "ABC" is the notification-allowed followee because the interest score=0.9 exceeds the threshold value. The followee processing unit 324 updates the user DB 318 so that the notifiable flag of the followee "ABC" of the user "USR1" is set to "Y". The followee processing unit 324 determines that the followee "DEF" is the notification-disallowed followee because the interest score=0.2 is below the threshold value. The followee processing unit 324 updates the user DB 318 so that the notifiable flag of followee "DEF" of the user "USR1" is set to "N".

The VIP/non-VIP common features and VIP-specific features between the user "USR2" and his/her followee "DEF" are as follows:

Total gift points=1000
Total number of comments=10
Average viewing rate=$^2/_{15}$=0.13
Average session=0.5/2=0.25
Average session rate=0.5/4=0.13

The VIP/non-VIP common features and VIP-specific features between the user "USR2" and his/her followee "DEF" are as follows:

Total gift points=3000
Total number of comments=30
Average viewing rate=$^5/_{20}$=0.25
Average session=$^2/_5$=0.4
Average session rate=$^2/_5$=0.4

The followee processing unit 324 refers to the VIP flag in the user DB 318 and determines that the user "USR1" is the non-VIP. The followee processing unit 324 selects the non-VIP classification model 326 between the VIP classification model 326 and non-VIP classification model 328 according to the determination result. The followee processing unit 324 inputs the VIP/non-VIP common features calculated as described above for the followee "ABC" into the selected non-VIP classification model 328. The non-VIP classification model 328 outputs the interest score that corresponds to the inputted features. For example, the non-VIP classification model 328 outputs the interest score=0.2 that corresponds to the values of the VIP/non-VIP common features for the followee "ABC". Similarly, the followee processing unit 324 inputs the VIP/non-VIP common features calculated as described above for the followee "DEF" into the selected non-VIP classification model 328. For example, the non-VIP classification model 328 outputs the interest score=0.6 corresponding to the values of the VIP/non-VIP common features for the followee "DEF".

The followee processing unit 324 determines that the followee "ABC" is the notification-disallowed followee because the interest score=0.2 is below the threshold value. The followee processing unit 324 updates the user DB 318 so that the notifiable flag of the followee "ABC" of the user "USR2" is set to "N". The followee processing unit 324 determines that the followee "DEF" is the notification-allowed followee because the interest score=0.6 exceeds the threshold value. The followee processing unit 324 updates the user DB 318 so that the notifiable flag of followee "DEF" of the user "USR2" is set to "Y".

When the notification control unit 330 detects a predetermined activity by a livestreamer on the livestreaming platform, it sends a push notification to a user for which the livestreamer is registered as the notification-allowed followee, and does not send the push notification to a user who is registered as a follower of the livestreamer but for which the livestreamer is not registered as the notification-allowed followee. In the above embodiment, the predetermined activity is the start of a livestream, but the embodiment is not limited to this. The predetermined activity may be, for example, registration of a livestreaming schedule by the livestreamer, posting by the livestreamer, or any other activity related to livestreaming on the livestreaming platform. The predefined activity is different from sending of a notification by the livestreamer himself/herself.

Upon reception of a start request from the livestreamer's user terminal 20 over the network NW, the notification control unit 330 refers to the user DB 318 and identifies the notifiable flag and user ID corresponding to the followee ID that matches the livestreamer's ID who made the start request. In other words, the notification control unit 330 identifies the user ID of the follower of the livestreamer related to the start request. When the identified notifiable flag is "Y," the notification control unit 330 includes the identified user ID in the user IDs of the users to be notified, and when the identified notifiable flag is "N," the identified user ID is not included in the user IDs of the users to be notified. The notification control unit 330 performs processing to send, to the user terminals of the users to be notified, a livestream start push notification notifying the users of the start of a livestream by the livestreamer related to the start request. The livestream start push notification may be sent directly to the user terminals by the notification control unit 330 or server 10, or the push notification may be requested to a push notification server different from the server 10 and sent to the user terminals by that push notification server.

In the example of FIG. 5, when the livestreamer "ABC" starts a livestream, the notification control unit 330 identifies, as a pair of the notifiable flag and user ID, ("Y", "USR1"), ("N", "USR5"), ("N", "USR2"), and ("Y", "USR6"). The notification control unit 330 includes "USR1" and "USR6" in the user IDs of the users to be notified. The notification control unit 330 performs processing to send the livestream start push notification to the user terminals of the users "USR1" and "USR6" to inform them of the start of a livestream by the livestreamer "ABC". In this case, the user "USR1", "USR5", "USR2", and "USR6" all follow the livestreamer "ABC", but among these four followers, the livestream start push notification is sent to "USR1" and "USR6", but not to "USR2" and "USR5".

When a predetermined period of time (e.g., 5 minutes, 15 minutes, or 1 hour) elapses after a notification-allowed followee of the user starts a livestream without the user participating in that livestream, the resending control unit 332 sends another livestream start push notification to that user. This allows followers to more reliably take a chance to view livestreams of their important followees and reduces the probability of missing the livestreams.

When a livestreamer who is not registered as a followee of the user satisfies a predetermined recommendation criterion, the recommendation control unit 334 sends a notification to the user recommending that the user should follow the livestreamer.

Figure 8:
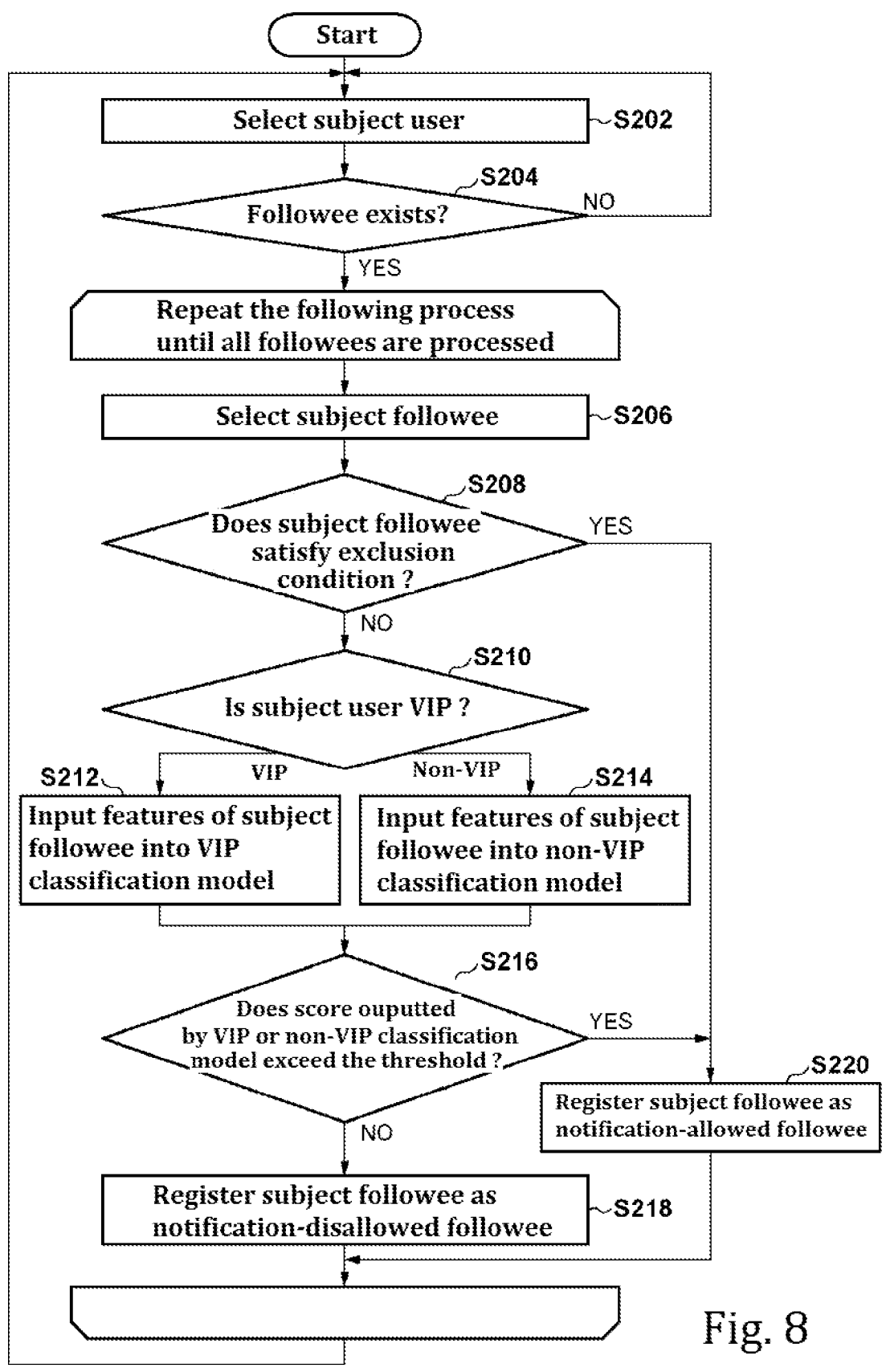
FIG. 8 is a flowchart showing a flow of a followee classification process performed by a followee processing unit of FIG. 3.

The operation of the livestreaming system 1 with the above configuration will be now described. FIG. 8 is a flowchart showing a flow of a followee classification process performed by the followee processing unit 324. The followee processing unit 324 periodically, for example once a day or once an hour, performs the followee classification process for all the user IDs registered in the user DB 318. The followee processing unit 324 refers to the user DB 318 and selects a user to be subject to the followee classification process (S202). The followee processing unit 324 may select a user ID registered in the user DB 318 in order from the top, or it may select a user ID for which a predetermined period of time has passed since the last selection.

The followee processing unit 324 determines whether the subject user has a followee(s) (S204). The followee processing unit 324 refers to the user DB 318, and determines that the user has no followee when there is no followee ID registered corresponding to the user ID subjected to the followee classification process (N in S204), and returns to step S202. When a followee ID is registered corresponding to the user ID of the subject user (Y in S204), the followee processing unit 324 repeats the following process until all followees of the user are processed. The followee processing unit 324 selects a followee subjected to the classification process from among the followees registered corresponding to the user ID of the subject user (S206). The followee processing unit 324 may sequentially select one of the followee IDs registered corresponding to the subject user ID. The followee processing unit 324 determines whether the followee selected in step S206 satisfies an exclusion condition (S208). The exclusion condition is a condition that defines users or followees to be excluded from the notification allowed/disallowed classification. The exclusion condition is satisfied when (1) a predetermined period of time has not passed since the subject user followed the followee to be processed, or (2) a predetermined period of time has not passed since the subject user registered on the livestreaming platform. When the exclusion condition is satisfied (Y in S208), the followee processing unit 324 registers the subject followee in the user DB 318 as the notification-allowed followee (S220). By setting the exclusion condition in this way, the livestream start push notification of a livestreamer can be reliably delivered to a user within a predetermined period of time after the user follows the livestreamer. Also, within a predetermined period of time after the user registered on the livestreaming platform, the livestream start push notification can be definitely delivered to the user. This predetermined period of time also allows for the collection of sufficient log data, which is the source of the feature calculation, and improves the accuracy of the outputted interest score.

When the exclusion condition is unsatisfied (N in S208), the followee processing unit 324 determines whether the subject user is the VIP (S210). When the VIP flag of the subject user ID registered in the user DB 318 is "Y" (VIP in S210), the followee processing unit 324 inputs the features of the subject followee into the VIP classification model 326 (S212). When the VIP flag of the subject user ID registered in the user DB 318 is "N" (non-VIP in S210), the followee processing unit 324 inputs the features of the subject followee into the non-VIP classification model 328 (S214).

The followee processing unit 324 determines whether the interest score outputted by the VIP classification model 326 (in the case of S212) or the non-VIP classification model 328 (in the case of S214) exceeds the threshold value (S216). When it exceeds (Y in S216), the process proceeds to step S220. Whereas when it does not exceed (N in S216), the followee processing unit 324 registers the subject followee in the user DB 318 as the notification-disallowed followee (S218). After all the followees of the subject user have been processed, the process returns to step S202.

Figure 9:
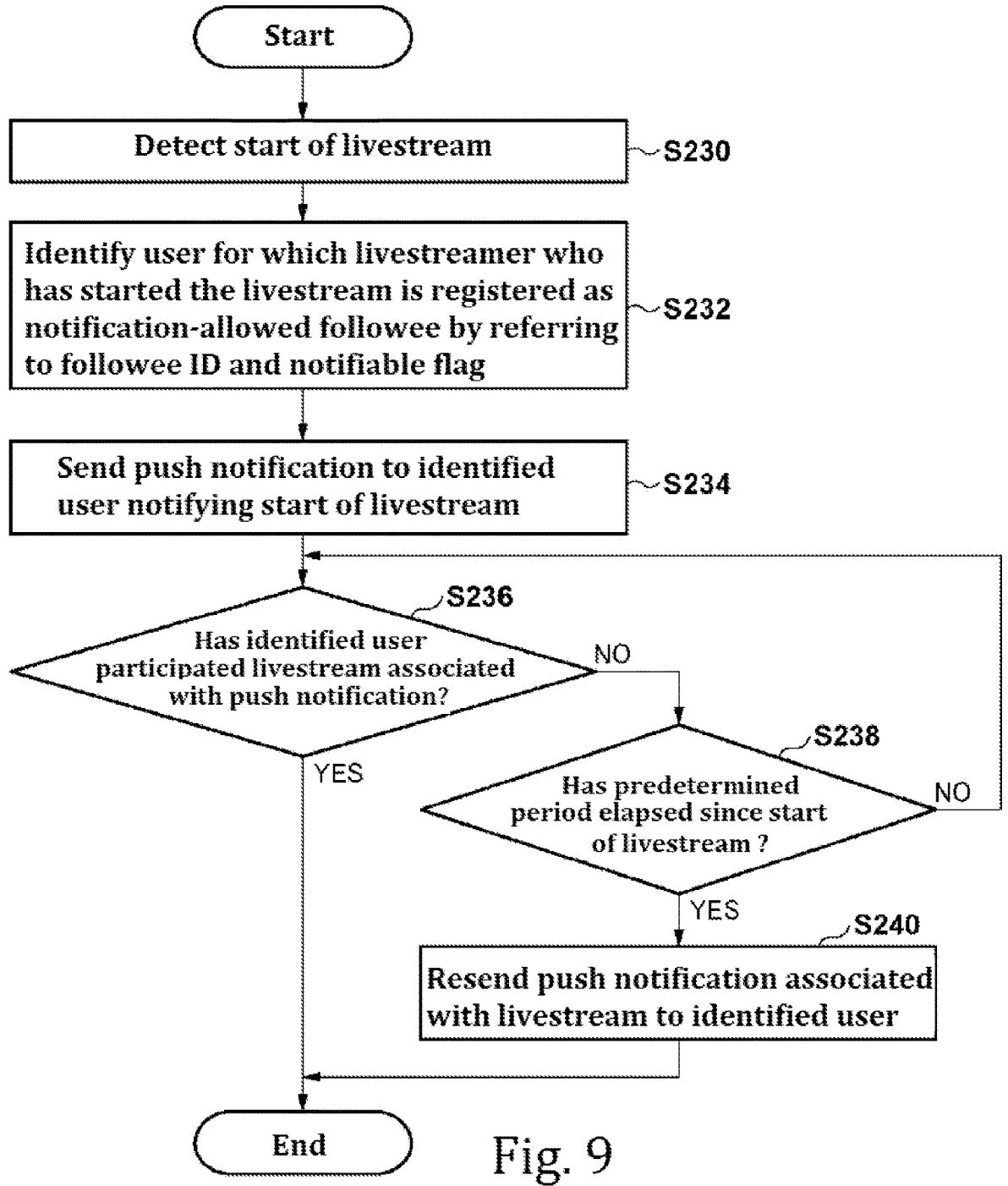
FIG. 9 is a flowchart showing a flow of sending and resending process of a livestream start push notification performed on the server of FIG. 1.
Figure 10:
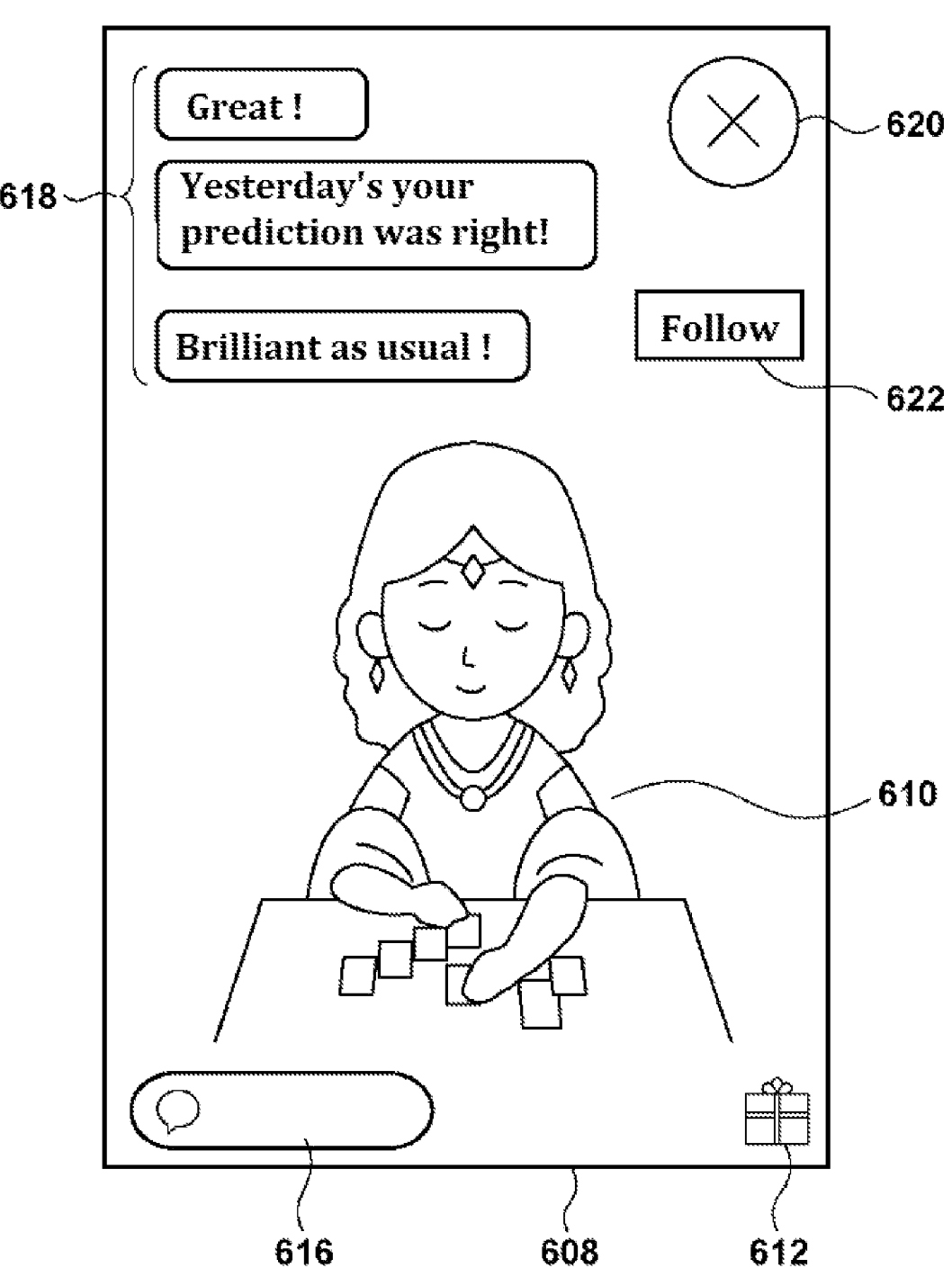
FIG. 10 is a representative screen image of a livestreaming room screen on a display of a viewer's user terminal.

FIG. 9 is a flowchart showing a flow of a sending and resending process of the livestream start push notification performed on the server 10 of FIG. 10. The notification control unit 330 detects the start of a livestream by a livestreamer (S230). The notification control unit 330 detects the start of the livestream when it receives a request to start the livestream from the livestreamer's user terminal 20. The notification control unit 330 identifies a user(s) for which the livestreamer who has started the livestream is registered as the notification-allowed followee by referring to the followee ID and notifiable flag in the user DB 318 (S232). The notification control unit 330 sends the push notification notifying the identified user(s) of the start of the livestream to the user terminal(s) of the user(s) identified in step S232 over the network NW (S234).

The resending control unit 332 determines whether the user(s) identified in step S232 has participated in the livestream for which the livestream start push notification has made (S236). When the user(s) has participated (Y in S236), the process ends. Whereas when the user(s) has not participated (N in S236), the resending control unit 332 determines whether a predetermined period of time has elapsed since the start of the livestream for which the push notification has made (S238). When the predetermined period of time has not elapsed(N of S238), the process returns to step S236. Whereas when the predetermined period has elapsed (Y in S238), the resending control unit 332 resends the livestream start push notification to the user terminal(s) of the user(s) identified in step S232 over the network NW (S240).

FIG. 10 is a representative screen image of a livestreaming room screen 608 shown on the display of the viewer's user terminal 30. The livestreaming room screen 608 displays a video image generated by the user terminal 20 of the livestreamer in real time. The livestreaming room screen 608 includes a video image 610 of a livestreamer obtained by reproducing the video data received from the server 10, a gift object 612, a comment input region 616, a comment display region 618, a quit viewing button 620, and a follow button 622. The viewer-side UI control unit 202 superimposes other objects such as the gift object 612, the comment input region 616, the comment display region 618, the quit viewing button 620, and the quit button 622 on the video image 610 obtained by reproducing the video data to generate the livestreaming room screen 608.

The comment display region 618 may include a comment entered by the viewer and comments entered by other viewers, and notifications from the system. The notifications from the system may include information who gave which gift to the livestreamer. The viewer-side UI control unit 202 generates the comment display region 618 including comments of other viewers and received from the server 10 and notifications from the system, and the viewer-side UI control unit 202 includes the generated comment display region 618 in the livestreaming room screen 608.

The comment input region 616 receives a comment input by the viewer. The viewer-side communication unit 204 generates a comment input signal that includes the comment entered in the comment input region 616, and transmits the signal to the server 10 over the network NW. At the same time, the viewer-side UI control unit 202 updates the comment display region 618 to display the comment entered in the comment input region 616.

The quit viewing button 620 is an object for accepting an instruction from the viewer to quit viewing the livestream.

When the viewer-side UI control unit 202 of the user terminal 30 detects a tap on the follow button 622, it accepts the tap as an instruction that the viewer follows the livestreamer. Upon receiving the instruction, the viewer-side communication unit 204 generates the follow request including the viewer ID of the viewer who instructed the follow and the livestreamer ID of the followed livestreamer, and transmits the request to the server 10 over the network NW. When the registration process of the follow pertaining to the follow request is completed at the server 10, the follow button 622 may be replaced with an object displaying the text "following".

Figure 11:
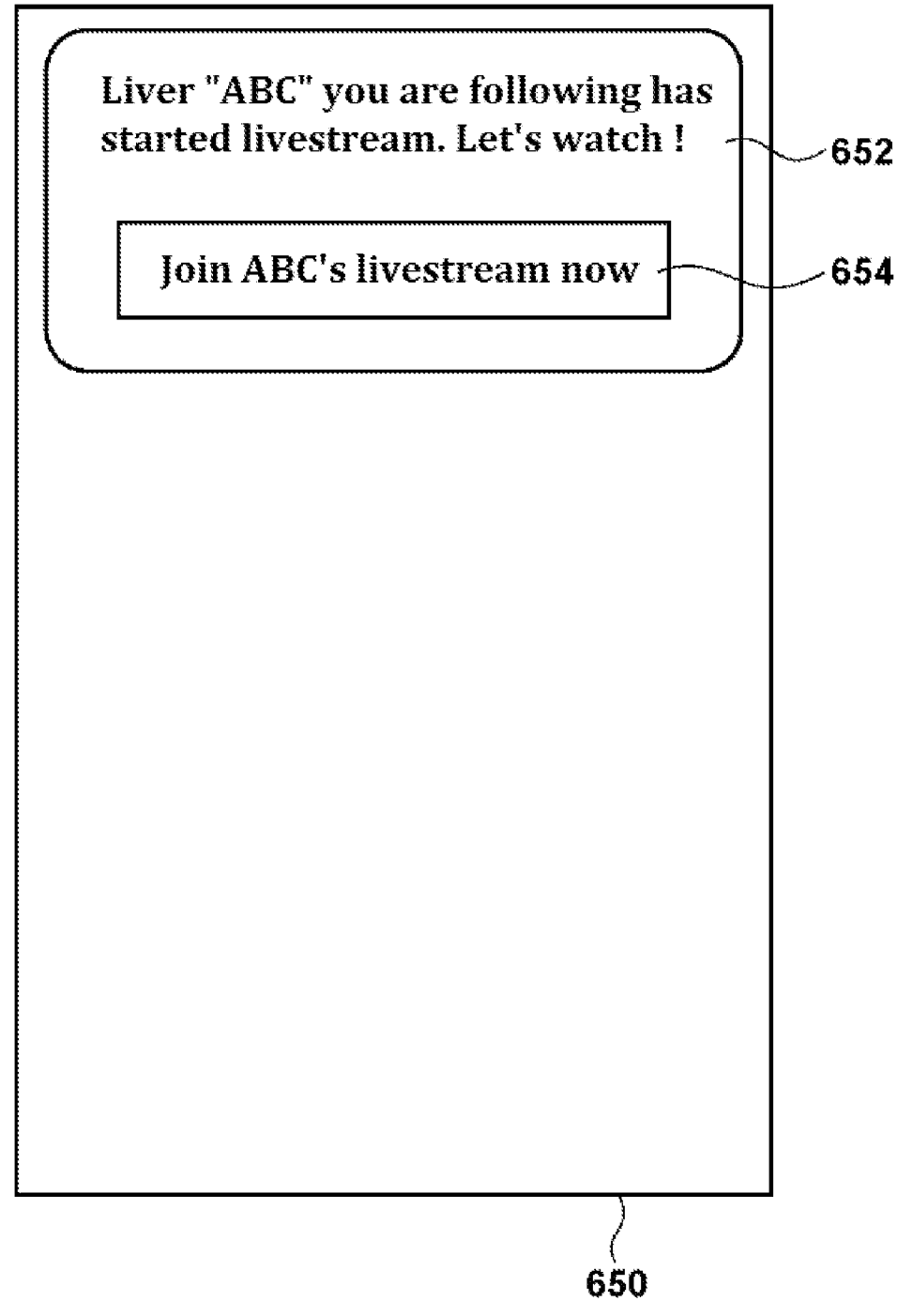
FIG. 11 is a representative screen image of a screen including a livestream start push notification displayed on a display of an active user's user terminal.

FIG. 11 is a representative screen image of a screen 650 including a livestream start push notification 652 displayed on a display of an active user's user terminal. The livestream start push notification 652 includes text indicating that the livestreamer that the active user is following has started a livestream, and a join button 654. When the out-of-livestream UI control unit 402 detects a tap on the join button 654, it accepts the tap as an instruction by the active user to start viewing the livestream. Upon reception of the instruction to start viewing, the out-of-livestream communication unit 404 generates a stream request including the stream ID of the livestream associated with the livestream start push notification 652, and transmits the stream request to the server 10 over the network NW.

In the above embodiment, an example of a holding unit includes a hard disk or semiconductor memory. It is understood by those skilled in the art that each element or component can be realized by a CPU not shown, a module of an installed application program, a module of a system program, or a semiconductor memory that temporarily stores the contents of data read from a hard disk, and the like.

With the livestreaming system 1 according to the embodiment, it is possible to suppress the number of livestream start push notifications that followers receive while enabling the followers to continue receiving livestream start push notifications that are important to the followers. This allows the followers to use the livestreaming platform more comfortably.

Once users follow a livestreamer, the users tend not to unfollow the livestreamer even if the users' interest in the livestreamer wanes. Therefore, the longer users use a livestreaming platform, the more followees they have, and the more push notifications they receive. If the number of push notifications notifying start of a livestream increases too much, they will be perceived as an obstacle, and more often they will be checked or deleted by the users. According to the embodiment, the livestream start push notifications from followees whom the users are no longer interested in are eventually eliminated, thus reducing or eliminating the stress that the users feel about the increase of the push notifications. In addition, the users, especially the VIPs, will not have to worry about the increase of the push notifications due to the increase in the number of followees, making them to feel easy to follow livestreamers. As a result, the livestreaming platform will foster an environment in which it is easier to follow, and the increase in the number of follows will help increase the motivation of the livestreamers.

In the livestreaming system 1, the VIP classification model 326 for the VIPs and the non-VIP classification model 328 for the non-VIPs are used. By using different models for the VIPs and non-VIPs, it is possible to construct models suitable for each of VIPs and non-VIPs that show different behaviors on the livestreaming platform.

In the livestreaming system 1, the total number of push notifications can be reduced by setting up the notification-disallowed followees, and push notification resources (servers, external services, etc.) can be used more effectively. It can also increase the likelihood that push notifications will be viewed, thereby increasing the probability of re-watching and improving user retention.

Figure 12:
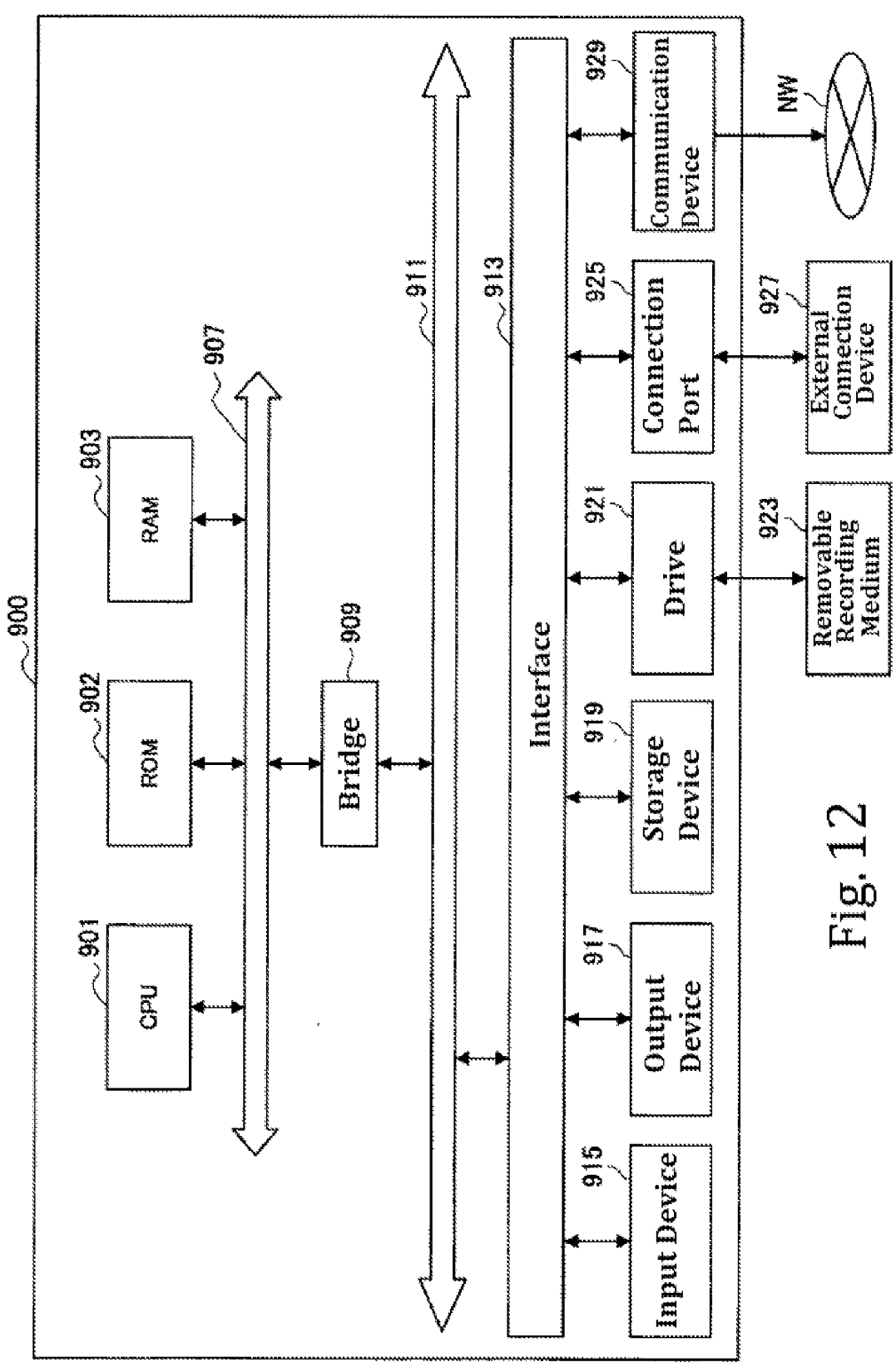
FIG. 12 is a block diagram showing an example of a hardware configuration of the information processing device according to the embodiment.

Referring to FIG. 12, the hardware configuration of an information processing device relating to an embodiment of the disclosure will be now described. FIG. 12 is a block diagram showing an example of the hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). The CPU 901 is an example of hardware configuration to realize various functions performed by the components described herein. The functions described herein may be realized by circuitry programmed to realize such functions described herein. The circuitry programmed to realize such functions described herein includes a central processing unit (CPU), a digital signal processor (DSP), a general-use processor, a dedicated processor, an integrated circuit, application specific integrated circuits (ASICs) and/or combinations thereof. Various units described herein as being configured to realize specific functions, including but not limited to the image capturing control unit 102, the audio control unit 104, a video transmission unit 106, the streamer-side UI control unit 108, and the streamer-side communication unit 110, the viewing unit 200, the viewer-side UI control unit 202, the viewer-side communication unit 204, the out-of-livestream processing unit 400, the out-of-livestream UI control unit 402, the out-of-livestream communication unit 404, the livestream information providing unit 302, the relay unit 304, the gift processing unit 308, the payment processing unit 310, the follow registration unit 322, the followee processing unit 324, the VIP classification model 326, the non-VIP classification model 328, the notification control unit 330, the resend control unit 332, the recommendation control unit 334, the stream DB 314, the user DB 318, and the gift DB 320, may be embodied as circuitry programmed to realize such functions.

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs including sets of instructions, calculation parameters, and the like used by the CPU 901. The RAM 903 serves as a primary storage that stores programs including sets of instructions to be used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/ Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the livestreaming system 1 in the embodiment have been described. This embodiment is merely an example, and it will be understood by those skilled in the art that various modifications are possible by combining the respective components and processes, and that such modifications are also within the scope of the present disclosure.

In the embodiment, a followee(s), who is a livestreamer(s) followed by a user, have been described as an example of a livestreamer of interest, who is registered by the user as a livestreamer that the user is interested in. However, the embodiment is not limited to this.

The technical concept of the embodiment can also be applied to cases where the livestreamer of interest is a livestreamer who is registered as a favorite by the user or a livestreamer who is registered as a friend by the user.

The case in which the interest score is calculated using the machine learning model has been described in the above embodiment, but the embodiment is not limited to this. Alternatively, the interest score may be calculated using a predetermined mathematical formula or on a rule basis.

In the above embodiment, the relationship between the interest score and the threshold value was used as the criterion for determining whether a followee is the notification-allowed followee or notification-disallowed followee. Alternatively, for example, followees can be sorted by the calculated interest score, the top N followees (N is a natural number) are registered as the notification-allowed followees and the rests are registered as notification-disallowed followees.

Although the case of resending the livestream start push notification to followers of the notification allowed followees has been described in the above embodiment, it is not limited to this case. For example, it can be configured to resend livestream start push notifications only to followers of a portion of the notification allowed followees with a higher interest score.

The return rate of the gift, which indicates the ratio of the reward to be awarded to the price points in the embodiment is merely an example, and the return rate may be appropriately set by the administrator of the livestreaming system 1, for example.

The technical idea according to the embodiment may be applied to live commerce or virtual livestreaming using an avatar that moves in synchronization with the movement of the streamer instead of the image of the streamer.

The procedures described herein, particularly those described with a flow diagram or a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present invention.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the viewer's user terminal may be performed by the server 10 or may be performed by the streamer's user terminal.

What is claimed is:

1. A server of a livestreaming platform comprising a circuitry including a processor and a storage medium, wherein the circuitry is configured to:

hold, in the storage medium, a user ID for identifying a user on the livestreaming platform and livestreamer-of-interest IDs for identifying livestreamers of interest registered by the user as livestreamers that the user is interested in, the user ID and the livestreamer-of-interest IDs being associated with each other;

provide a plurality of machine learning models for outputting an interest score;

select, by the processor, one of the plurality of machine learning models based on an amount of money spent by the user on the livestreaming platform;

divide, by the processor, the livestreamers of interest into notification-allowed livestreamers of interest and notification-disallowed livestreamers of interest, based on the interest score outputted by the selected one of the plurality of machine learning models;

transmit, by the processor, a notification to the user when at least one of the notification- allowed livestreamers of interest performs a predetermined activity; and not transmit the notification to the user when any one of the notification-disallowed livestreamers of interest performs the predetermined activity.

2. The server of claim 1, wherein the processor selects the notification-allowed livestreamers of interest from among the livestreamers of interest of the user, and registers a result of the selection in the storage medium in association with the user, wherein the circuitry is further configured to send, by the processor functioning as a notification control unit, upon detection of the predetermined activity by a livestreamer on the livestreaming platform, a notification to a user for which the livestreamer is registered as the notification-allowed livestreamer of interest, and not send the notification to a user for which the livestreamer is registered as the livestreamer of interest but not as the notification-allowed livestreamer of interest.

3. The server of claim 1, wherein the processor divides the livestreamers of interest of the user into the notification-allowed livestreamers of interest and the other livestreamers of interest according to a predetermined criterion, wherein the predetermined criterion is set so that a degree of interest of the user in the notification-allowed livestreamers of interest is higher than a degree of interest of the user in the other livestreamers of interest.

4. The server of claim 1, wherein the predetermined activity is start of a livestream.

5. The server of claim 1, wherein the circuitry is further configured to, when a non-registered livestreamer who is not registered as the livestreamer of interest of the user satisfies a predetermined recommendation criterion, send, by the processor functioning as a recommendation control unit, a notification to the user recommending that the user register the livestreamer as the livestreamer of interest.

6. The server of claim 1, wherein the circuitry is further configured to resend, by the processor functioning as a resending control unit, the notification to the user when a predetermined period of time elapses after the notification-allowed livestreamer of interest of the user starts a livestream without the user participating in the livestream.

7. A method performed in a server of a livestreaming platform, comprising: holding, in a storage medium, a user ID for identifying a user on the livestreaming platform and livestreamer-of-interest IDs for identifying livestreamers registered by the user as livestreamers that the user is interested in, the user ID and the livestreamer-of-interest IDs being associated with each other;

provide a plurality of machine learning models for outputting an interest score;

select one of the plurality of machine learning models based on an amount of money spent by the user on the livestreaming platform;

dividing the livestreamers of interest into notification-allowed livestreamers of interest and notification-disallowed livestreamers of interest, based on the interest score outputted by the selected one of the plurality of machine learning models;

transmitting a notification to the user when at least one of the notification-allowed livestreamers of interest performs a predetermined activity; and not transmitting the notification to the user when any one of the notification-disallowed livestreamers of interest performs the predetermined activity.

* * * * *